United States Patent Office 3,450,639
Patented June 17, 1969

3,450,639
PROCESS FOR THE SEPARATION OF MOLYBDENUM FROM FISSION PRODUCT CONTAINING SOLUTIONS
Alain Maria, Bagnols-sur-Ceze, and Pierre Patigny and Daniel Perie, Cherbourg, France, assignors to Commissariat à l'Energie Atomique, Paris, France
No Drawing. Continuation-in-part of application Ser. No. 605,976, Dec. 30, 1966. This application Feb. 20, 1967, Ser. No. 617,032
Int. Cl. B01d 11/02; C01g 39/00
U.S. Cl. 252—301.1                          3 Claims

ABSTRACT OF THE DISCLOSURE

A process for the separation of molybdenum from solutions, especially nitric acid solutions containing fission products and derived from the processing of irradiated uranium-molybdenum fuels. Phosphoric acid is added to the nitric acid solutions containing fission products, the quantity of phosphoric acid being sufficient to effect total complexing of the molybdenum in the form of a phosphomolybdic complex. The fission product solutions are contacted with an organic phase constituted by trilaurylamine which may be diluted and which serves to extract the phosphomolybdic complex. The addition of phosphoric acid and contacting with the organic phase are performed simultaneously, the complete process being carried out in a bank of mixer-settlers. The volumes of aqueous phase and organic phase which are contacted are in a proportion of approximately 1:4 and the contacting times are of the order of one minute.

---

This is a continuation-in-part of application Ser. No. 605,976, filed on Dec. 30, 1966, and now abandoned, and relates to a process for the separation of molybdenum from solutions, especially nitric acid solutions containing fission products as obtained after extraction of plutonium and uranium from irradiated fuel elements, with more specific reference to fuel elements of the uranium-molybdenum type.

In irradiated fuel reprocessing plants, concentrated waste solutions of fission products are at present stored in tanks contained in thick concrete cells which are intended to guard against leakage hazards and to afford adequate shielding against radiations.

Storage capacities are always limited and are in keeping with the processing potential of plants of this type. It is therefore important to ensure that fission products are stored in a minimum volume.

The fuels employed in nuclear reactors are frequently alloyed with molybdenum which, in such cases, is the major constituent in the mixture of fission products. For instance, in the case of a fuel which is alloyed with 1% molybdenum, one ton of uranium will therefore contain 10 kilograms of molybdenum. In plants which process unalloyed uranium, fission product solutions represent 25 liters per ton of processed uranium, whereas 100 liters of fission products are present in the same quantity of uranium which is alloyed with 1.5 percent Mo.

When it is found necessary to reduce by evaporation the volume of nitric acid solutions which contain fission products and which are obtained after extraction of plutonium and uranium from irradiated U/Mo fuels, it is desirable to proceed first to the extraction of molybdenum by reason of the low solubility of this element in nitric acid.

The present invention is directed to a process for extracting molybdenum from solutions and especially from nitric acid solutions containing fission products and derived from the processing of irradiated U/Mo fuels.

The process according to the invention is characterized in that phosphoric acid is added to the nitric acid solutions containing fission products, the quantity of phosphoric acid being sufficient to effect total complexing of the molybdenum in the form of a phosphomolybdic complex, and in that said solutions are contacted with an organic phase constituted by trilaurylamine which may be diluted and which serves to extract the phosphomolybdic complex, the addition of phosphoric acid and contacting with the organic phase being carried out simultaneously.

Preferably, use is made of a trilaurylamine salt and in particular the nitrate of trilaurylamine.

The ability of trilaurylamine to extract phosphomolybdic acid can be demonstrated by experiment as follows:

An organic phase consisting of trilaurylamine mononitrate having a concentration of 0.3 M and diluted in dodecane is contacted in a separating funnel with a phosphomolybdic acid solution containing 100 g./l. of Mo. The amount of molybdenum remaining in the aqueous phase is determined by ammonium sulphocyanide colorimetry.

The results which are recorded in the table given below were obtained in respect of contacting times of the order of one minute and in the case of tests performed at 25° C. They clearly demonstrate the fact that the ratio of the volumes of organic phase and aqueous phase which are contacted with each other plays an important part. It is apparent that 98% of the molybdenum are extracted when the volume ratio of aqueous phase to organic phases is 1:2 and 99.9% are extracted when the ratio is 1:4.

| Volume in aqu. phase, ml. | Volume in org. phase, ml. | Ratio, aqu. phase/ org. phase | Mo, g./l. in the phase after extraction |
|---|---|---|---|
| 3 | 1.5 | 1:0.5 | 95 |
| 3 | 3 | 1:1 | 38 |
| 3 | 6 | 1:2 | 2 |
| 3 | 9 | 1:3 | 0.13 |
| 3 | 12 | 1:4 | 0.06 |
| 3 | 18 | 1:6 | 0.04 |
| 3 | 30 | 1:10 | 0.02 |

Furthermore, the extraction of phosphomolybdic acid by trilaurylamine results in a contraction of the volume of the aqueous phase which is a function of the quantity of phosphomolybdic acid extracted. For example, it is found that, for a solution containing a proportion of molybdenum of 100 g./l., extraction by trilaurylamine results in a contraction of the aqueous phase of 10%. A simple separation of the phosphomolybdic acid therefore results in an appreciable reduction in the volume of the fission product solution.

In the case of industrial application of the process according to the invention, nitric acid solutions are withdrawn from the column bases of the extraction units in which uranium and plutonium have been separated from irradiated fuels and receive an addition of phosphoric acid which combines with molybdenum to form phosphomolybdic acid. Phosphoric acid is added in a sufficient quantity to permit of complete complexing of the molybdenum and this quantity is substantially stoichiometric.

The aqueous phase is then contacted with an organic phase constituted by trilaurylamine which may be diluted in an inert solvent such as dodecane. The volumes of aqueous phase and organic phase which are thus contacted are preferably in a proportion of approximately 1:4. The extraction process is carried out in a bank of mixer-settlers at a temperature in the vicinity of 40° C. in order to prevent crystallization of the trilaurylamine. The contacting times are of the order of one minute and the yields are higher than 99%. The phosphomolybdic acid is then stripped from the organic phase by means of an alkaline aqueous solution (for example a solution of sodium hydroxide and ammonia).

The extraction of molybdenum from nitric acid solutions containing fission products additionally permits the possibility of recovering the fission products. In fact, in the processes which have been employed up to the present time, the addition of phosphoric acid causes the precipitation of phosphates and some phosphomolybdates whereas, in the process according to this invention, the formation and extraction of phosphomolybdic acid take place preferentially with respect to the precipitations of the phosphates and phosphomolybdates.

Concentrations of molybdenum higher than 100 g./l. can be obtained in the organic phase without any danger of precipitation of phosphomolybdates.

The invention makes profitable use of the fact that the kinetics of extraction of phosphomolybdic acid by trilaurylamine are more rapid than the kinetics of precipitation of phosphates and phosphomolybdates in the aqueous phase, thereby permitting the quantitative passage of molybdenum into the organic phase under conditions previously defined.

After extraction of the phosphomolybdic acid by trilaurylamine, there is found to be present a clear solution of fission products which can be recovered by any known means and then converted.

EXAMPLE

The starting material employed was an aqueous phase having a nitric acid concentration of 0.1 N and containing 10 g./l. of uranium and 996 mg./l. of molybdenum in the form of phosphomolybdate. The aqueous phase was contacted with an organic phase constituted by a 20% solution of trilaurylamine in dodecane. The volumes of aqueous and organic phases contacted were in a proportion of 1:10. The extraction was performed in a bank of mixer-settlers at ambient temperature. The contacting time was one minute. There were found to be present in the organic phase 8.9 g./l. of molybdenum in the form of phosphomolybdic acid and 118 mg. of molybdenum which remained in the aqueous phase.

We claim:
1. A process for the separation of molybdenum from nitric acid solutions containing fission products after extraction of plutonium and uranium from irradiated fuels of the uranium-molybdenum type, the steps of adding phosphoric acid to the nitric acid solutions containing fission products, the quantity of phosphoric acid being substantially stoichiometric with respect to the molybdenum to be removed to effect total complexing of the molybdenum, then contacting said solutions with an organic phase of trilaurylamine diluted in an inert solvent and then extracting molybdenum by an alkaline aqueous solution, the addition of phosphoric acid and contacting with the organic phase being carried out simultaneously.

2. A process in accordance with claim 1, the solvent employed for the dilution of the trilaurylamine being dodecane.

3. A process in accordance with claim 1, the volumes of aqueous phase and organic phase to be contacted with each other being in a proportion of approximately 1:4.

References Cited

UNITED STATES PATENTS

| | | | |
|---|---|---|---|
| 2,833,616 | 5/1958 | Voiland | 23—339 |
| 2,838,367 | 6/1958 | Clark | 23—339 |
| 2,839,357 | 6/1958 | Clark et al. | 23—339 |
| 2,885,260 | 5/1959 | Maraman et al. | 23—339 |
| 3,148,941 | 9/1964 | Gens | 23—339 X |
| 3,180,703 | 4/1965 | Ableson et al. | 23—341 |
| 3,223,476 | 12/1965 | Hart | 23—340 |
| 3,359,079 | 12/1967 | Bathellier | 23—339 |

CARL D. QUARFORTH, *Primary Examiner.*

M. J. SCOLNICK, *Assistant Examiner.*

U.S. Cl. X.R.

23—309, 312, 340; 260—429